J. G. & J. H. STOKESBARY.
HARROW.

No. 181,995. Patented Sept. 5, 1876.

WITNESSES:
E. Wolff
John Goethals

INVENTOR:
J. G. Stokesbary
J. H. Stokesbary
BY
ATTORNEYS.

UNITED STATES PATENT OFFICE.

JESSE G. STOKESBARY AND JOHN H. STOKESBARY, OF MILLERSBURG, IOWA.

IMPROVEMENT IN HARROWS.

Specification forming part of Letters Patent No. 181,995, dated September 5, 1876; application filed July 11, 1876.

*To all whom it may concern:*

Figure 1:
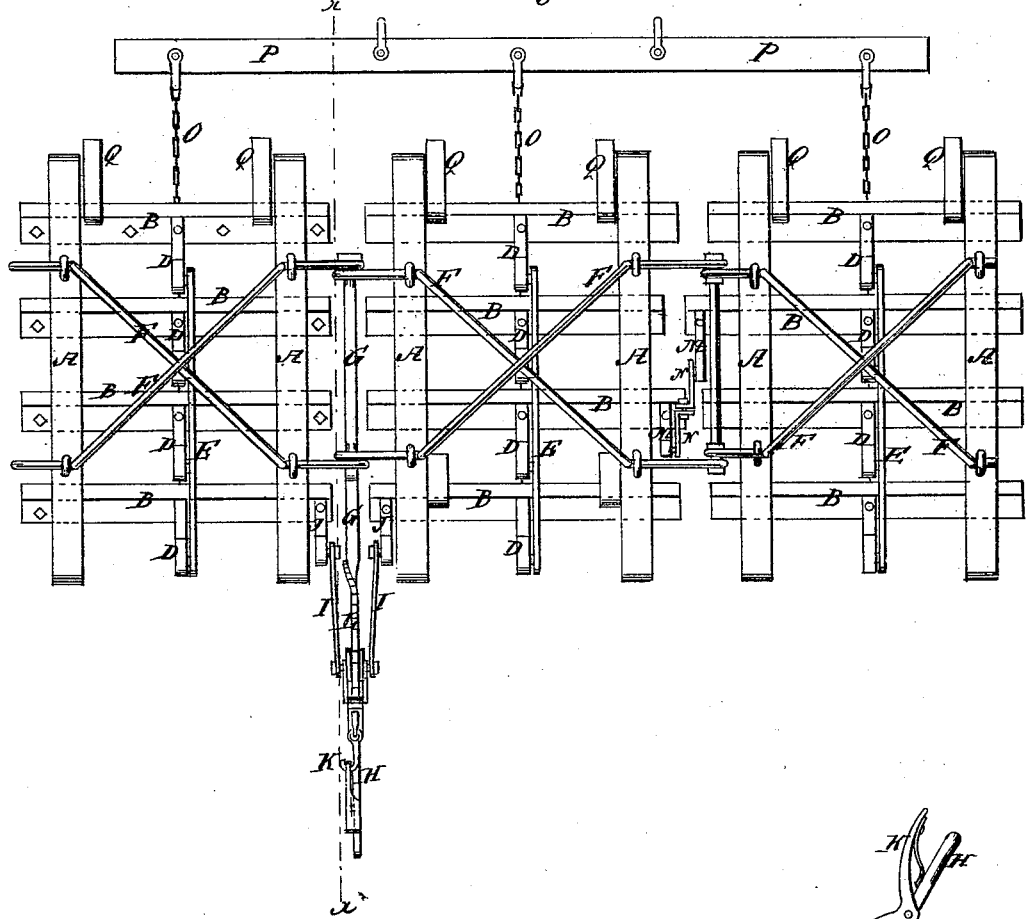
Figure 2:
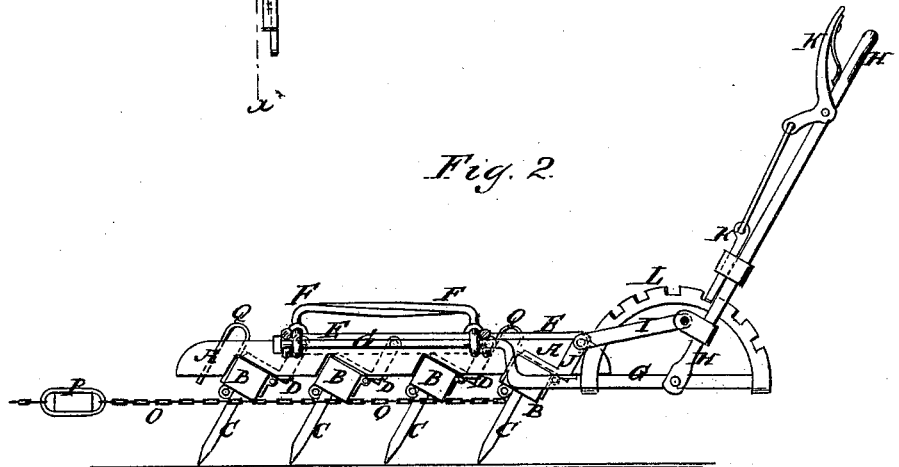

Be it known that we, JESSE G. STOKESBARY and JOHN H. STOKESBARY, of Millersburg, in the county of Iowa and State of Iowa, have invented a new and useful Improvement in Harrow, of which the following is a specification:

Figure 1 is a top view of our improved harrow. Fig. 2 is a vertical section of the same taken through the line $x\ x$, Fig. 1.

Similar letters of reference indicate corresponding parts.

The object of this invention is to furnish an improved harrow, which shall be so constructed that it may be adjusted for use as a large or as a small harrow, that it may be adjusted to clear it of rubbish without stopping the team, and that may be used for any and every kind of harrowing, and upon any and every kind of ground, and which shall be simple in construction and easily operated.

The invention consists in the harrow-sections formed of the longitudinal bars notched upon their lower sides, the hinged cross-bars that receive the teeth, the elbow-arms, the connecting-bars, and the diagonal brace-rods, having eyes formed in their ends to receive the hinging rods or bolts; in the combination of the lever, the connecting-bars, the elbow-arms, the spring lever pawl, and the notched bar, with the projecting rear end of the hinging bolt or rod, and with the ends of the hinged cross-bars of two adjacent sections; in the combination of the bent arms and the connecting-bar with the ends of the hinged cross-bars of two adjacent sections; in the combination of the draw-chains with the middle parts of the hinged cross-bars of the sections and with the draw-bar; and in the combination of the runners with the notched longitudinal bars of the sections, as hereinafter fully described.

The harrow is made in sections, and two, three, or more sections, may be used, as may be desired. Each section consists of two longitudinal bars, A, and four, more or less, cross-bars, B, in which the teeth C are inserted. The bars A are notched upon their lower sides, to receive the cross-bars B, and the said cross-bars B are hinged at the rear edge of their upper sides to the bars A, at the rear side of their notches, so that the said bars B may be turned to give the teeth C a forward inclination, a vertical position, or a rearward inclination, as may be required. To each of the cross-bars B is attached a bent or elbow arm, D, the upper ends of which are pivoted to a bar or rod, E, so that all the bars B may be held in exactly the same position, and may be turned together.

To the forward and rear parts of the bars A of each section are attached two rods, F, that cross said section diagonally, and the ends of which project laterally, and have eyes formed in them to receive the rods or long bolts G, which have heads upon one end and nuts upon the other end, and which hinge the sections together and make the harrow flexible, so that it may adjust itself to uneven or rough ground.

One of the rods or bolts G is extended to the rearward, and to it is pivoted a lever, H, to which are pivoted the rear ends of two connecting-rods, I, the forward ends of which are pivoted to bent or elbow arms J, attached to the adjacent ends of the rear bars B of the two sections, so that the said bars B of the two sections may be turned to adjust the teeth C by operating the lever H. To the lever H is attached a spring lever pawl, K, which enters notches formed in the curved bar L, attached to the rod or bolt G, to hold the said lever H, and through it the teeth C, in any position into which they may be adjusted.

When more than two sections are used, the bars B of the side sections are connected with the bars B of the adjacent section by bent or elbow arms M, and a bar, N, pivoted to them.

To the under side of the middle part of the cross-bars B of each section is attached a chain, O. The forward ends of the chains O are all attached to the draw-bar P, to which the double-trees are attached by clevises in the usual way.

To the forward cross-bars B of the sections are attached small runners, Q, which may be turned down to support the harrow when it is to be drawn from place to place, to prevent the teeth C from being worn, and to prevent them from tearing up the ground.

Having thus described our invention, we claim as new and desire to secure by Letters Patent—

1. The harrow-sections formed of the bars A, notched upon their lower sides, the hinged bars B, that receive the teeth C, the elbow-arms D, the connecting-bars E, and the diagonal brace-rods F, having eyes formed in their ends to receive the rods or bolts G, substantially as herein shown and described.

2. The combination of the lever H, the connecting-bars I, the elbow-arms J, the spring lever pawl K, and the notched bar L, with the projecting rear end of the bolt or rod G, and with the ends of the hinged bars B of two adjacent sections, substantially as herein shown and described.

3. The combination of the bent arms M and the connecting-bar N with the ends of the hinged bars B of two adjacent sections, substantially as herein shown and described.

4. The combination of the draw-chains O with the middle parts of the hinged bars B of the sections, and with the draw-bar P, substantially as herein shown and described.

5. The combination of the runners Q with the notched bars A and transverse bars B of the sections, substantially as herein shown and described.

JESSE G. STOKESBARY.
JOHN H. STOKESBARY.

Witnesses:
WILLIAM E. DONAKER,
WILLIAM CARY.